M. M. MARCUSE

DISPENSING CABINET

Oct. 2, 1928.

Re. 17,092

Original Filed Dec. 5, 1925

2 Sheets-Sheet 1

WITNESS

Oliver W. Holmes

INVENTOR

Moses M. Marcuse

BY

Knight Bros

ATTORNEYS

M. M. MARCUSE

Oct. 2, 1928.

DISPENSING CABINET

Re. 17,092

Original Filed Dec. 5, 1925

2 Sheets-Sheet 2

WITNESS

Oliver K. Holmes

INVENTOR

Moses M. Marcuse

BY

Knight Bros

ATTORNEYS

Reissued Oct. 2, 1928.

Re. 17,092

UNITED STATES PATENT OFFICE.

MOSES M. MARCUSE, OF NEW YORK, N. Y., ASSIGNOR TO WEST DISINFECTING COMPANY, OF LONG ISLAND CITY, NEW YORK, A CORPORATION OF NEW YORK.

DISPENSING CABINET.

Original No. 1,658,608, dated February 7, 1928, Serial No. 73,406, filed December 5, 1925. Application for reissue filed May 1, 1928. Serial No. 274,310.

This invention relates to dispensing cabinets for towels, paper and other articles and materials of a similar nature.

The primary object contemplated in my invention is to simplify the construction of dispensing containers of this character in such a way as to render it more effective in its operation and less burdensome to care for. Toward this end, my invention contemplates an improved container or receptacle which is movable bodily into and out of the cabinet without disturbing other parts to which it is cooperatively related.

One of the objects of my invention is to provide an improved construction and arrangement of web-feeding mechanism within a dispensing cabinet and with respect to a removable container or receptacle for the articles or materials to be dispensed. In this connection, one of the ends contemplated was to provide a dispensing cabinet peculiarly adapted to be mounted in a fixed position but having those parts which were related in any manner to the care or replenishment of the machine readily accessible and removable.

Certain subsidiary objects of invention will appear in the specification in connection with the forgoing objects, reference being had to the appended claims in connection with the accompanying drawings which show a preferred embodiment of the invention.

In the drawings:—

Figure 1:
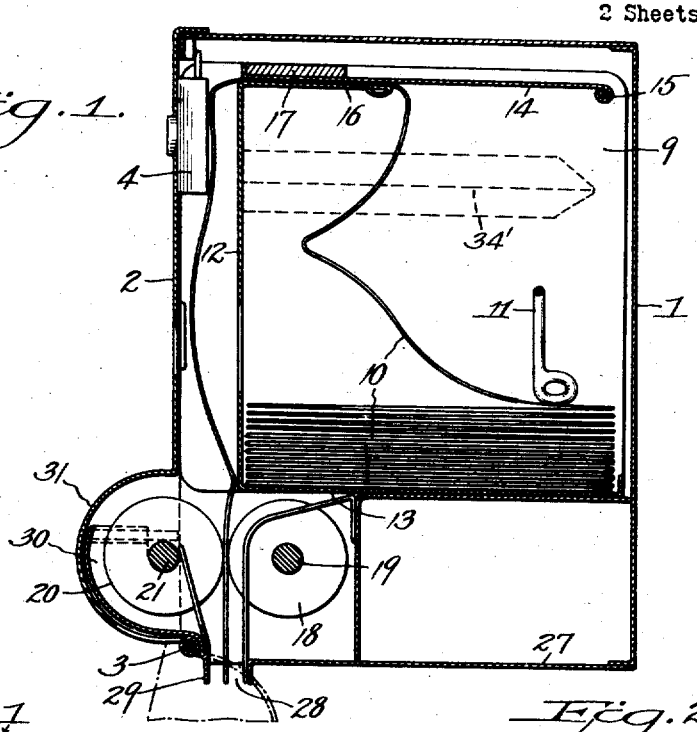
Figure 1 is a vertical section of a dispensing cabinet constructed in accordance with the principles of the present invention, parts being shown in elevation.
Figure 3:
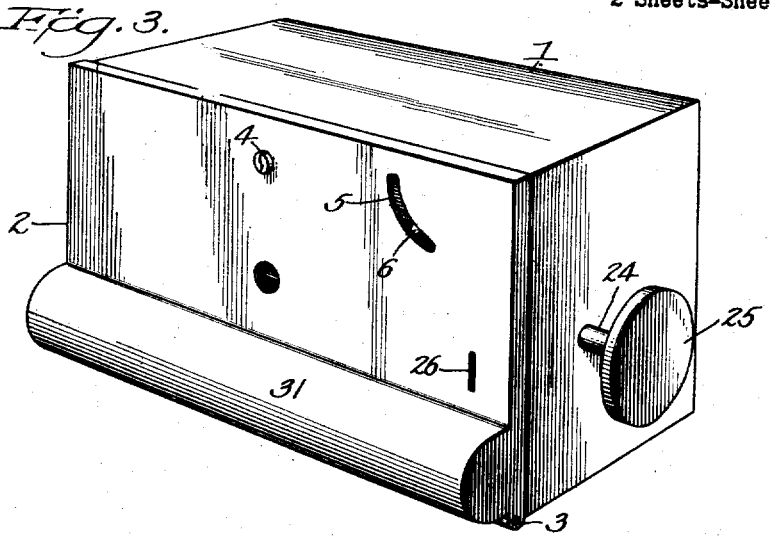
Figure 3 is a perspective view on a reduced scale of the cabinet complete.
Figure 4:
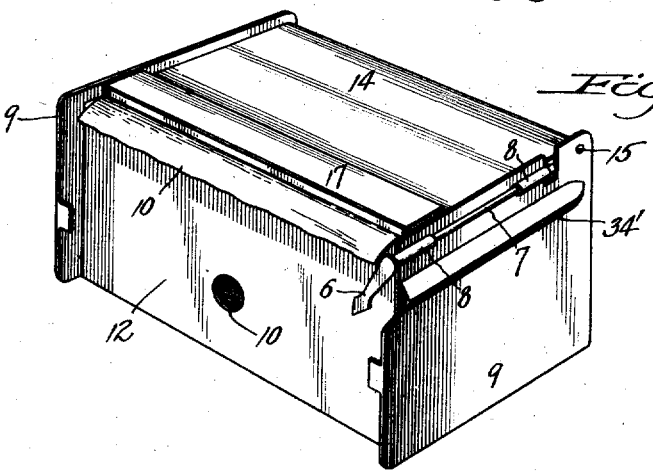
Figure 4 is a similar perspective view of the container or receptacle removed from the cabinet.

Referring more particularly to the drawings, in the embodiment shown therein, the cabinet 1 is provided with a movable front wall 2 which for this purpose may be pivotally mounted on a pintle 3 at the lower forward edge of said cabinet. The upper swinging edge of the cover 2 may be secured by a lock 4 and as shown in Figure 3 is provided with an arcuate slot 5 through which may be seen an indicator arm 6. As shown in Figure 4, the indicator arm 6 is carried by the forward end of an oscillatory rod 7 mounted in bearings 8 on one of the end walls 9, 9, of the movable container or receptacle. In the present embodiment of my invention, this receptacle is adapted to receive a continuous web 10 arranged with a zig-zag fold as shown in Figure 1. Rigid with the oscillatory rod 7 is a detector arm 11 which bears upon the folded web and thus locates the indicator arm 6 and serves to indicate the amount of stock remaining in the receptacle.

Figure 2:
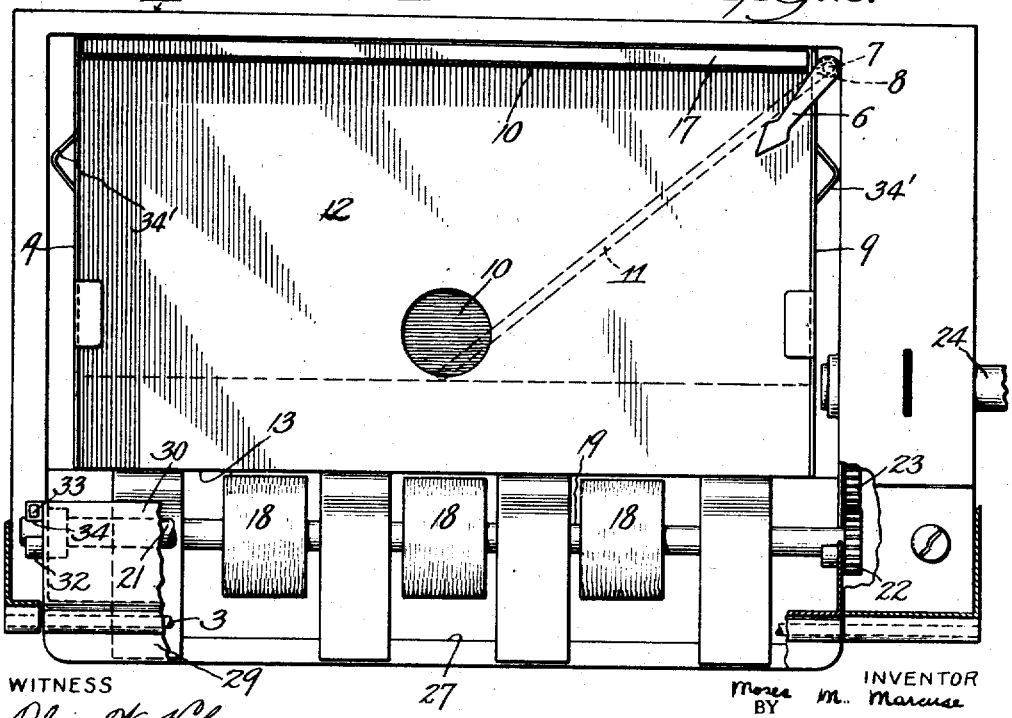
Figure 2 is a front elevation of the same with a front cover in open position, parts being broken away and parts shown in section.

As shown in Figures 1, 2 and 4, the removable receptacle comprises the end walls 9, 9, a front wall 12, a bottom wall 13 and a cover plate 14 which is hinged on a pintle 15 within the end walls 9, 9. It will be seen from an inspection of Figure 1 that the removable receptacle is open at the back to permit free access to the folded web within said receptacle, said cover plate 14 being adapted to be revolved on its pintle 15 into position to substantially fill this opening whenever a new web of material is being started through the apparatus. A table or platen 16 is presented inwardly from the upper forward corner of the removable receptacle and is preferably constructed as an integral extension of the material which forms the front wall 12 which is bent over and secured to the end walls 9, 9. The cover plate 14 rests at its forward edge on the platen 16 or the web 10 which is drawn thereover. To render said cover plate more effective as a drag upon the outgoing web 10, it is provided along its forward edge with a weight 17.

Figure 5:
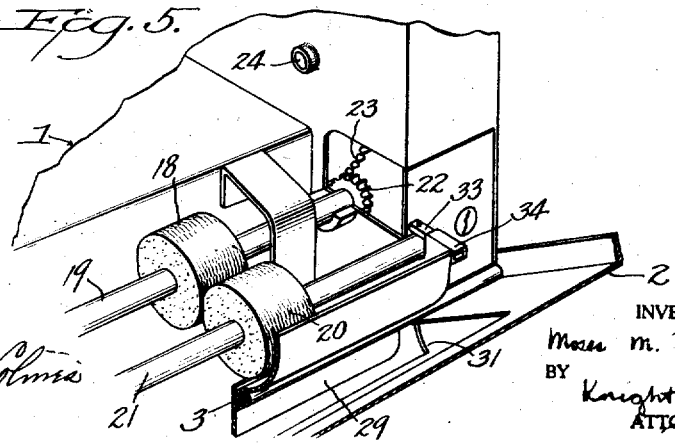
Figure 5 is a fragmentary perspective view of the feeding mechanism, contiguous portions of the housing being broken away and parts shown in section.

It will appear from Figure 1 that the web 10 passes between table or platen 16 and the weighted forward edge 17 of the cover 14, said web being drawn downwardly and passed between feed rollers 18 on a shaft 19 and feed rollers 20 on a shaft 21, said shafts being suitably journaled to retain the feed rollers in peripheral contact with each other or in gripping engagement with an interposed web. Referring to Figures 2 and 5, it will be seen that feed rollers 20 are paired with the feed rollers 18, the shaft 19 which carries the latter being provided with a spur gear 22 which meshes with a coin controlled spur gear 23.

The spur gear 23 is keyed to a shaft 24 which carries on its outer end a manually operated knob 25 which may be operated when suitable coin controlled mechanism (not shown) is released by the insertion of a coin in a slot 26.

As shown in Figure 1, the bottom wall 27 of the housing 1 is provided with a downwardly presented slot or opening 28 through which the web is fed by the feed rollers 18 and 20. A flange 29 is suitably arranged to serve as a tearing edge at the end of each limited feed movement permitted by the coin control mechanism. A suitable guard or apron 30 may be arranged to extend partway around the peripheries of the feed rollers 20. In order to accommodate this forward extension of the parts, the front cover 2 of the main housing is provided with a cylindrical protuberant portion 31, the space within the protuberant wall 31 affording ready access to the slot 28 for positioning the web when the front cover 2 is permitted to hang vertically as indicated in dotted lines in Figure 1.

Whenever occasion arises to charge the cabinet with a fresh supply of paper toweling, the front cover 2 is opened, the removable receptacle is withdrawn and the fresh stock inserted within from the rear, the detecting arm 11 being raised for this purpose. The top plate 14 may now be swung about its pivot 15 to hang within the rear opening between the end walls 9, 9. The free end of the web is next drawn over the table or plate 16 after which the top plate 14 is returned to its normal position as shown in Figure 1. The removable container is now ready to be inserted into the cabinet and the free end of the web drawn downwardly through the slot or opening 28 at the bottom of the cabinet. In order to facilitate this manipulation, the forward shaft 21 carrying the feed rollers 20 is movably journaled in end bearings 32, said shaft 21 being normally retained in position by a sliding bar 33 at either end. Each of said bars is slidably mounted in a box-like guide 34.

Suitable means for guiding the removable container into and out of the cabinet may be provided by suitable ribs 34′ on the opposite ends walls 9, 9, of the receptacle. The free edge of the web having been drawn through the opening 28, the feed rollers 20 with their shaft 21 may be reinserted and the cabinet closed in readiness to be placed in service. It will also be understood from the foregoing description, that the inner wall of the protuberant portion 31 of the cabinet front cover 2, forms a part-circular recess within which the feed rollers 20 with their shaft 21 may be deposited while the web is being arranged prior to the replacement of the removable feed rollers.

It will be noted (Figures 1 and 4) that the end walls 9, 9, of the removable container project forward beyond the front wall 12 and bottom wall 13 so that the front 12 is thus inset from the forward edges of these end walls. These projecting portions of the end walls serve to position the container in the cabinet and provide a space for the web, and also for the indicator arm 6.

It will be noted (Figures 1 and 2) that the enlarged rounded lower or inner free end of the swinging detector arm 11 forms a follower. According to this invention this follower is utilized for two purposes or has a double function. In view of the preceding description and as shown in the drawings, it will now be clear that, besides serving to operate the indicator arm 6, this follower constitutes a restraining member for the web. It presses down upon the top of the folded web pack in the container so as to hold down the folds thereof in compact relation and puts the end portion of the web under frictional tension as it is withdrawn from the top of the folded web over the top web guide formed by the edge portion 16 of the front wall 12, by the feed rollers 18 and 20. This prevents the upper folds of the web from rising up loosely in advance. Also it straightens out the fold kinks and avoids any objectionable looseness in the end portion of the web within the container as it is drawn upward to the top web guide 16 in dispensing. This prevents the clogging of the machine and the tearing of the web as it passes over the upper edge of the front wall 12 and beneath the weighted cover plate 14.

It may be noted that the follower restrains that portion of the top fold of the web which is between this follower and the rear wall 1 and all of the folds below the top fold while leaving free and unrestrained that portion of the top fold which is between this follower and the front wall 12. The small amount of initial slack in this latter web portion (Figure 1) will be immediately taken up within the container and straightened out under tension.

It is obvious that various modifications may be made in the construction shown in the drawings and above particularly described, within the principle and scope of the invention as defined in the appended claims.

I claim:

1. A portable receptacle for dispensing cabinets, provided with an opening in its rear wall for receiving the material to be dispensed, a front wall having a platen extending inwardly from the upper edge thereof, and a top wall having its forward edge normally resting upon said platen whereby the stock to be dispensed is placed under tension as it is drawn over said platen and between it and the forward edge of said cover, said top being revolvable about its rear edge into position to close said opening in the rear wall of said receptacle.

2. A dispensing container comprising laterally spaced end walls, a front wall, a platen arranged in the plane of the upper edge of said front wall, a cover pivoted between said end walls upon an axis extending transversely to said end walls and adjacent to the upper rear corners thereof said cover being revolvable about its axis from a position in which its forward edge rests upon said platen into a position in which it depends from said axis, said container having an opening at the back for accommodating said cover in depending position.

3. A dispensing container for a folded continuous web, said container comprising laterally spaced end walls, an inset front wall, a cover pivoted between said end walls upon an axis extending transversely to said end walls and adjacent to the upper rear corners thereof, said cover having its forward edge resting upon the upper edge of said front wall, a detector arm arranged within said container, a shaft for carrying said detector arm, said shaft being oscillatable upon an axis extending from front to rear of the upper edge of one of said end walls, and an indicator arm oscillatable with said detector arm, said indicator arm being arranged in the space between said front wall and the forward edges of said end walls.

4. In a dispensing cabinet, a receptacle for a web to be dispensed, said receptacle having a platen adjacent its upper forward corner and a drag pivoted upon an axis distant from said platen and having its forward edge resting upon said platen, said receptacle being provided with an opening in its top and rear walls to permit said drag to be revolved about its axis to depend therefrom.

5. A dispensing container for a folded continuous web, said container being provided with a front wall over the upper edge of which said web may be drawn, a drag pivoted on an axis distant from the upper edge of said front wall and normally adapted to exert a yieldable pressure upon the web as it passes over said upper edge, said drag being movable around its axis from its normal operative position into a position in which it depends from its axis at the rear of said container.

6. In a dispensing cabinet for a continuous web, the combination of an upright web container of rectangular shape including a front wall and a flat horizontal bottom wall for supporting a pack of reversely folded continuous web in which flat folds extend horizontally in superimposed relation backward and forward between the front wall of and the rear of the container, an outer casing body having a front wall thereof spaced forwardly from the front wall of the web container, a transverse horizontal web guide adjacent to the upper edge of the front wall of the web container over which and down between the front wall of the web container and the front wall of the casing an end portion of the web is drawn from the top of the folded web pack in dispensing, and a restraining member for the web comprising a follower free for vertical movement in the web container arranged to press down upon the top of the folded web pack for holding down the folds thereof in compact relation so as to limit the length of the end portion thereof which is set free and for placing this end portion under frictional tension so that thereby its looseness will be taken up and the fold kinks therein substantially straightened out within the container between the follower and the said web guide as the web is drawn upwardly to and over the web guide and thence downwardly through the space between said front walls in dispensing.

7. The invention defined in claim 6 in combination with a swinging arm pivoted on an axis at right angles to the said web guide near the top and one side of the web container extending transveresely over the web pack in the container and carrying the web-restraining follower on its free end.

8. The invention defined in claim 6, in combination with a pivot shaft extending at right angles to said web guide near the top and one side of the web container, a swinging arm fixed to said shaft and extending transversely over the top of the web pack in the container and carrying the web-restraining follower on its free end, and an indicator arm carried by the forward end of said shaft visible from the outside of the front of the casing for giving a visual indication of the amount of web in the container.

9. The invention defined in claim 6, in which the outer casing has a bottom wall spaced below the bottom wall of the web container, in combination with a rear feed roller journaled in the casing body below the forward portion of the bottom wall of the web container and parallel with said web guide, and a front feed roller to cooperate with the rear feed roller for drawing the web downward from said web guide in dispensing and mounted to be moved away from the rear feed roller to provide for introducing the web between the feed rollers.

10. A dispensing device for a continuous web comprising a casing body including a front door, a transverse web guide near the top of the casing over which an end portion of a stock of web in the casing is drawn in dispensing, a rear feed roller journaled in the casing body below and parallel with said web guide, and a front feed roller adjacent the door cooperating with the rear feed roller to draw the web downward from said web guide in dispensing and mounted to be moved away from the rear feed roller to provide for introducing the web between the feed rollers.

11. A dispensing device for a continuous web comprising a casing body having a front door, a transverse web guide spaced rearwardly from the front door near the top of the casing over which an end portion of a stock of web in the casing may be drawn in dispensing, an exit slot for the dispensed web being provided in the casing bottom, a rear feed roller journaled in the casing body in the lower portion thereof rearward from said slot, a front feed roller to cooperate with the rear feed roller for drawing the web downward from said web guide in dispensing and mounted to be moved away from the rear feed roller to provide for introducing the web between the feed rollers, a rotatable handle knob at the outside of the casing, and rotatable operating connections between the handle knob and one of the said feed rollers including intermeshing toothed gears.

MOSES M. MARCUSE.